United States Patent
Heiskanen et al.

(10) Patent No.: US 10,240,288 B2
(45) Date of Patent: Mar. 26, 2019

(54) METHOD OF PRODUCING MICROFIBRILLATED CELLULOSE

(71) Applicant: Stora Enso OYJ, Helsinki (FI)

(72) Inventors: Isto Heiskanen, Imatra (FI); Henri Kastinen, Imatra (FI); Anna Kauppi, Lappeenranta (FI); Jukka Kankkunen, Imatra (FI); Lars Axrup, Hammaro (SE); Cecilia Land Hensdal, Forshaga (SE); Heidi Saxell, Vantaa (FI); Kaj Backfolk, Jyvaskyla (FI)

(73) Assignee: Stora Enso OYJ, Helsinki (FI)

(*) Notice: Subject to any disclaimer, the term of this patent is extended or adjusted under 35 U.S.C. 154(b) by 509 days.

(21) Appl. No.: 14/758,708

(22) PCT Filed: Dec. 30, 2013

(86) PCT No.: PCT/FI2013/051213
§ 371 (c)(1),
(2) Date: Jun. 30, 2015

(87) PCT Pub. No.: WO2014/106684
PCT Pub. Date: Jul. 10, 2014

(65) Prior Publication Data
US 2015/0337493 A1    Nov. 26, 2015

(30) Foreign Application Priority Data

Jan. 4, 2013    (FI) .................................... 20135016

(51) Int. Cl.
*D21C 9/00* (2006.01)
*D21H 11/18* (2006.01)
(Continued)

(52) U.S. Cl.
CPC .............. *D21C 9/007* (2013.01); *C08B 15/08* (2013.01); *C08L 1/04* (2013.01); *D21D 1/20* (2013.01);
(Continued)

(58) Field of Classification Search
CPC ...................................................... D21C 9/007
See application file for complete search history.

(56) References Cited

U.S. PATENT DOCUMENTS 3,382,140 A    5/1968   Henderson et al.
3,642,139 A *  2/1972   Wilson .................... B04B 3/04
                                                    210/213
(Continued)

FOREIGN PATENT DOCUMENTS

CA    1251718    3/1989
EP    2508671    10/2012
(Continued)

OTHER PUBLICATIONS

French et al., A mini pulp evaluation procedure, 1994, Appita vol. 47, p. 38-43.*
(Continued)

*Primary Examiner* — Anthony Calandra
(74) *Attorney, Agent, or Firm* — Greer, Burns & Crain Ltd.

(57) ABSTRACT

The invention relates to methods of producing microfibrillated cellulose (MFC). According to the invention a fibrous pulp suspension is fibrillated mechanically at a consistency of less than 12.5%, dewatered to raise the consistency of the fibrillated suspension to at least 12.5%, and then subjected in the dewatered condition to further fibrillation. Alternatively an initially fibrillated fibrous pulp suspension may be dewatered and fibrillated in the dewatered condition, after which these dewatering and fibrillating steps are repeated (Continued)

one or more times so that pulp consistency is increased for each fibrillation step. The goals of raising the consistency between subsequent fibrillations are energy saving and an increased aspect ratio in MFC. The invention even comprises uses of the MFC product, e.g. as an additive for papermaking furnish or injection molded plastic composites.

19 Claims, 2 Drawing Sheets

(51) Int. Cl.
    *D21H 17/00*     (2006.01)
    *D21H 11/04*     (2006.01)
    *C08B 15/08*     (2006.01)
    *C08L 1/04*     (2006.01)
    *D21D 1/20*     (2006.01)

(52) U.S. Cl.
    CPC ............ *D21H 11/04* (2013.01); *D21H 11/18* (2013.01); *D21H 17/005* (2013.01)

(56) References Cited

U.S. PATENT DOCUMENTS

| | | | |
|---|---|---|---|
| 4,341,807 A | 7/1982 | Turbak et al. | |
| 6,361,650 B1 | 3/2002 | Danielsson et al. | |
| 2008/0054107 A1 | 3/2008 | Koslow et al. | |
| 2011/0303372 A1* | 12/2011 | Beatson | D21B 1/16 162/24 |
| 2012/0135506 A1* | 5/2012 | Heiskanen | D21C 5/005 435/277 |

FOREIGN PATENT DOCUMENTS

| | | |
|---|---|---|
| JP | 2008075214 | 4/2008 |
| WO | 0031335 | 6/2000 |
| WO | 2006033605 A1 | 3/2006 |
| WO | 2007091942 | 8/2007 |
| WO | 2010131016 | 11/2010 |
| WO | 2011004301 | 1/2011 |
| WO | 2011015708 A1 | 2/2011 |
| WO | 2011055148 | 5/2011 |
| WO | 2011114004 | 9/2011 |
| WO | 2012072874 | 6/2012 |
| WO | 2012097446 | 7/2012 |
| WO | 2012172170 | 12/2012 |

OTHER PUBLICATIONS

European Patent Office, European Search Report and Written Opinion, PCT/FI2013/051213, dated Jul. 12, 2016.
Pardis, Mark A., et al. "Determination of drainage resistance coefficients under known shear rate", TAPPI Journal, Aug. 1, 2002, pp. 12-18.
Suryanegara, Lisman, et al. "The synergetic effect of phenylphosphonic acid zinc and microfibrillated cellulose on the injection molding cycle time of PLA composites", Cellulose, Mar. 1, 2011, pp. 689-698, vol. 18, No. 3, Kluwer Academic Publishers, NL.
International Searching Authority, Written Opinion of the International Searching Authority, PCT/FI2013/051213, dated Mar. 27, 2014.
International Searching Authority, Preliminary Report on Patentability, PCT/FI2013/051213, dated Jul. 7, 2015.
National Board of Patents and Registration of Finland, Search Report, FI-20135016, dated Oct. 25, 2013.

* cited by examiner (a)

(b)

METHOD OF PRODUCING MICROFIBRILLATED CELLULOSE

This application is a U.S. National Phase under 35 U.S.C. § 371 of International Application No. PCT/FI2013/051213, filed Dec. 30, 2013, which claims priority under 35 U.S.C. §§ 119 and 365 to Finnish Application No. 20135016, filed Jan. 4, 2013.

BACKGROUND OF THE INVENTION

The present invention concerns a method of producing microfibrillated cellulose (MFC). The invention even comprises uses of MFC obtained by said method. In connection with the invention "microfibrillated cellulose" or "MFC" also covers what is known as nanofibrillated cellulose (NFC).

Microfibrillated cellulose (MFC) is hereby defined as fibrous material comprised of cellulosic fibrils, which are very thin, of a diameter of about 5 to 100 nm, in average about 20 nm, and have a fibril length of about 20 nm to 200 μm although usually of 100 nm to 100 μm. Nanofibrillated cellulose (NFC) is a specific class of MFC with fibre dimensions at the low end of said fibril size range. In the MFC individual microfibrils are partly or totally detached from each other. Fibers that have been fibrillated and which have microfibrils on the surface and microfibrils that are separated and located in a water phase of a slurry are included in the definition MFC. MFC has a very large open active surface area, generally in the range of about 1 to 300 $m^2/g$, and is useful for a wide range of end used, notably in the field of papermaking.

Prior art methods of manufacturing MFC include mechanical disintegration by refining, milling, beating and homogenizing, and refining e.g. by an extruder. These mechanical measures may be enhanced by chemical or chemoenzymatic treatments as a preliminary step.

U.S. Pat. No. 4,341,807 describes production of MFC by passing a fibrous suspension repeatedly through a small diameter orifice subjecting the liquid suspension to a pressure drop. The starting suspension contains 0.5 to 10 wt-% of cellulose. The product is a homogenous gel-formed suspension of MFC.

WO 2007/091942 A1 describes a process, in which chemical pulp is first refined, then treated with one or more wood degrading enzymes, and finally homogenized to produce MFC as the final product. The consistency of the pulp is taught to be preferably from 0.4 to 10%. The advantage is said to be avoidance of clogging in the high-pressure fluidizer or homogenizer.

The above two prior art references relate to what may be referred to as low consistency (LC) refining through use of dilute suspensions. WO 2012/097446 A1 instead describes a process of making NFC by multipass high consistency (HC) refining of chemical or mechanical fibers. In the reference HC refers to a discharge consistency of more than 20 wt-%. The product comprises a population of free filaments and filaments bound to the fiber core from which they were produced. The fiber diameter is reduced from about 8-45 μm of common papermaking fibers to the nanometer scale of less than 100 nm. The advantage is obtaining NFC with a high aspect ratio, i.e. the length of the fibril in relation to its diameter, which yields improved intrinsic strength of the product.

WO 2012/072874 A1 teaches a multistep process of producing NFC, in which cellulose is refined with a first refiner, the product is divided into an accept fraction and reject fraction, water is removed from the accept fraction, and finally the accept fraction is refined with a second refiner to obtain a gel-like product with fiber diameter of 2 to 200 nm. At the first refining step the consistency of the material is under 10% but increased by removal of water to about 15% or even 20% to enhance washing of the same. For the second refining the pulp would be diluted back to a consistency under 10%.

U.S. Pat. No. 3,382,140 teaches preparation of high consistency papermaking pulp, in which pulp obtained from kraft pulping is first dewatered to obtain a non-fluid or semi-solid mass, which is non-pumpable. The dewatered mass, having a consistency of 20 to 30%, is then refined, diluted to a conventional papermaking consistency and formed into a paper web. There is no mention of production of MFC, and the teaching of direct use of the mass as a papermaking furnish does not suggest MFC either, the latter being known as a minor additive in such furnishes only.

In WO 2011/114004 there is described a different approach of fibrillating lignocellulosic material based on treatment with ionic liquid, i.e. molten salt, which preserves fibres basically intact. Salts comprising an imidazolium type cation are mentioned as an example of such liquids. The process is said to weaken the binding between fibrils or tracheids and separate fibrils or tracheids from fibre walls.

SUMMARY OF THE INVENTION

A problem with conventional low-consistency refining with hammer or ball mills is that large amounts of energy is consumed for continued fibrillation after the initial phase of the process. Partial hydrolysis of semicrystalline lignocellulose by use of chemicals or enzymes would help, but the drawback is degrading the cellulose fibrils, loss of yield and high costs of enzymatic treatment.

Instead of refining with hammer or ball mills a microfluidizer or homogenizator may be used. However, the fibrillation process requires pre-treatment of the pulp suspension and a relatively low concentration in order to operate smoothly and energy efficiently.

A common drawback of LC fibrillations is that the resulting suspension is dilute and thus expensive to transport to another location for being used. On the other hand HC fibrillation, such as described e.g. in U.S. Pat. No. 3,382, 140, has relatively high energy consumption, initial runnability of the refiner is poor, and the known HC methods therefore are not economically viable.

In general the problems with the existing methods are limitations in productivity and difficulty in scaling up the process. As for refining an additional problem is cutting of the fibers, resulting in a low aspect ratio (the fibre length in relation to the fibre diameter) and loss of fiber strength. For homogenizator-based fibrillation scaling-up would require a multiple set of fibrillation units as well as a consistency enhancer, which further makes the process difficult to scale up.

The problem to be solved is to provide a method for the production of fibrillated cellulose or lignocellulose, which is scalable has reduced overall energy consumption. The goal is also to obtain MFC at an increased consistency for reduced transport costs for the product, facilitate storage and package as well as a high aspect ratio of the product to make it useful as a strengthening additive to papers or boards and various composites.

The solution according to the invention is production of microfibrillated cellulose (MFC) through the steps of:

(a) mechanically fibrillating fibrous pulp suspension at a consistency of less than 12.5%;
(b) dewatering fibrillated pulp obtained from step (a) to a consistency of at least 12.5%; and
(c) subjecting the dewatered pulp from step (b) to further fibrillation at a consistency of 12.5 to 20%.

The gist of the invention may be said to be stepwise fibrillation of the suspension so that a first fibrillation is carried out in the low consistency and the next fibrillation in the high consistency range.

In connection with the present invention low consistency (LC) is defined to mean a suspension consistency of less than 12.5 wt-%, typically 1 to 10 wt-%. In preferred embodiment consistency can be 2 to 8 wt-%, preferably 3 to 5 wt-%. High consistency (HC) means a suspension consistency of 12.5 to 20 wt-%, typically 15 to 20 wt-%. Medium consistencies (MC) as sometimes referred to in the art may be interpreted as belonging to the LC and HC categories according to said 12.5 wt-% dividing line.

As a useful modification the invention even comprises production of microfibrillated cellulose (MFC) through the steps of:
(a) fibrillating fibrous pulp suspension,
(b) dewatering the fibrillated pulp obtained from step (a),
(c) repeating said fibrillating and dewatering steps (a) and (b) one or more times, with pulp consistency increased for each fibrillation step (a), and
(d) subjecting the dewatered pulp from the final dewatering step (b) to a final fibrillation step.

In the above modification there is a progressive rise of the pulp consistency, and the limit of 12.5% between LC and HC ranges is preferably passed in the course of the process.

The present inventors surprisingly found that after initial fibrillation of coarser pulp suspension at the LC range, i.e. less than 12.5% and preferably less than 10%, the consistency can at a subsequent step be increased by dewatering to the range of 12.5 to 20%, preferably to the range of 15 to 20%. This concentrated suspension is then fibrillated with a HC fibrillating device, e.g. HC refiner or extruder. The advantage of this is that fiber-fiber friction occurs more intensively and causes fibrillation with higher amounts of high aspect ratio MFC.

If refining in low consistency is done in several refiners in series, $1^{st}$ refiner can be loaded heavily, $2^{nd}$ refiner less and so on until loading cannot be done. This is because fiber material becomes finer, and less refining loading can be applied into the stock. As every refiner has so called no-load energy demand (no load, energy demand measured with water); for the same effect the less energy can be put on fibers, the more energy is needed. This disadvantage will be overcome by increasing the consistency of the stock in accordance with the present invention (by increasing consistency more of the refining energy is going into fibrillation).

In comparison, a sequence of refining steps at a constant low consistency would require progressively increased energy to achieve continued fibrillation, thus being very ineffective. HC refining without preliminary LC fibrillation would similarly be energy consuming and ineffective. The invention, however offers an optimal solution with reduced energy spending and an improved MFC product.

The target is to achieve high aspect ratio MFC with better mechanical properties, less fiber cutting, and a product that is more suitable for composites and products in which tear strength is needed.

Another benefit is that less amount of fines are obtained compared to traditional MFC production as disclosed in prior art. Also a better yield and less sugar content in water phase are achieved.

DETAILED DESCRIPTION

Figure 1:
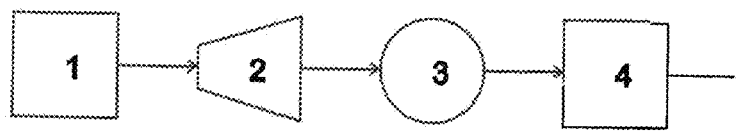
FIGS. 1 and 2 are schematic representations of possible embodiments of the present invention.

A preferred method of producing microfibrillated cellulose (MFC) according to the invention comprises the steps of (a) mechanically fibrillating fibrous pulp suspension at a LC of less than 12.5 wt-%, (b) dewatering fibrillated pulp derived from said fibrillating step to a HC of at least 12.5 wt-%, and subjecting the dewatered pulp from the dewatering step to further fibrillation.

The method of invention runs on commercially available devices and can be scaled-up for bulk production. Suitable methods have been discussed e.g. in Papermaking Part 1, Stock Preparation and Wet End, Volume 8, Editor: Hannu Paulapuro, 2008. The method also enhances runnability in the HC fibrillation step and thereby energy consumption is reduced. The resulting product is homogenous, fibres have a high aspect ratio and the amount of fines is low. The product also has a high solid content and probably also a reduced water holding capacity compared to products obtained by use of traditional methods.

According to one embodiment said first fibrillation step (a) is low consistency (LC) fibrillation at a consistency below 12.5 wt %, preferably at most wt-10%, and said further fibrillation step (c) is high consistency (HC) fibrillation at a consistency of 12.5 to 20 wt-%, preferably 15 to 20 wt-%. Low consistency in the first fibrillation step reduces flocculation of the fibers. LC fibrillation step also reduces the energy consumption in HC fibrillation. Dewatering increases the solid content of the final product and reduced volume is a remarkable economical advantage in transportation.

There can be one or more low consistency fibrillation steps before the pulp is dewatered to a high consistency. Preferably the consistency is increased between each low consistency fibrillation step so that the refining energy goes to fibrillation in each refining step. Water fraction containing a low solid content can be circulated back to the low consistency fibrillation step(s).

According to one embodiment said first fibrillation step (a) is refining and said further fibrillation step (c) is refining or extrusion. This results in fibres having a high aspect ratio.

According to one embodiment the pulp is refined to more than 45° SR or more preferably to more than 60° SR, and most preferably to over 80° SR. This step is preferably made at low or medium concentration. Refining pulp to a higher ° SR results in lower energy consumption and better runnability of machinery during HC fibrillation.

Another preferred way of practicing the invention is producing microfibrillated cellulose (MFC) through the steps of:
(a) fibrillating fibrous pulp suspension,
(b) dewatering the fibrillated pulp obtained from step (a), (c) repeating said fibrillating and dewatering steps (a) and (b) one or more times, with pulp consistency increased for each fibrillation step (a), and (d) subjecting the dewatered pulp from the final dewatering step (b) to a final fibrillation step.

The advantages achieved by the method have been discussed above. Increasing consistency allows the refining energy being used to fibrillation in each step.

According to a further embodiment of the invention the dewatered pulp subjected to the final fibrillation step has a consistency in the range of 15 to 20 wt-%.

According to a further embodiment of the invention the pulp subjected to the final fibrillation step has a drainage resistance SR of at least 45°, preferably at least 60°, and most preferably at least 80°.

According to a further embodiment of the invention the first fibrillation step is performed to pulp having a consistency of at most 10 wt-%.

According to a further embodiment of the invention said first fibrillation step (a) is low consistency (LC) fibrillation at a consistency below 10 wt-%, and said final fibrillation step (d) is high consistency (HC) fibrillation at a consistency of 15 to 20 wt-% or even more. High consistency fibrillation results in a product having a high solid content which makes packing and transportation easier, environmental friendly and more cost efficient.

According to a further embodiment of the invention a conical or disc refiner is used for the first fibrillation step (a), and a refiner or an extruder is used for the final fibrillation step (d). Low consistency and a conical or disc refiner machine allow using bars that give low fiber cutting effect.

According to a further embodiment of the invention dewatering is performed by pressure screening. Pressure screening is an effective way for removing excess water and allows also fractionating the pulp by fibre length, if desired.

After dewatering the fibrillated fraction of the separated aqueous phase with usually a low solid content can be circulated back to the process in order to reduce water consumption and avoid loss of fibres.

According to a further embodiment of the invention a fraction retained by the screen is subjected to further fibrillation. It is found that using several refining steps results in more homogeneous refining results and better fibre strength properties than single-step refining.

According to a further embodiment of the invention dewatering is performed by centrifuging or with gap washer.

According to a further embodiment of the invention a chemical such as a refining aid or an enzyme is used to enhance defibrillation. Chemicals lowering or increasing fiber to fiber friction and/or fiber flocculation can be used for promoting fibrillation and runnability of the machinery. Examples of such chemicals known to a person skilled in art and commonly used as refining additives are poly-saccharides such as CMC and starches, but also nanoparticles. Enzymes, such as cellulases and hemicellulases, can be used for enhancing the fibrillation by loosening the structure of lignocellulose or cellulose or by modifying the fibre properties. Chemicals can also be used for pH regulation, when necessary. Typically the pH is close to neutral since an acid pH prevents water penetration to the fibres and thereby promotes cutting and generating fines and too alkaline pH makes it difficult to keep fibres on the bar edges.

According to the invention the fibrous pulp suspension can comprise one or more of chemical pulp, chemithermomechanical pulp (CTMP), thermomechanical pulp (TMP), groundwood pulp, nanopulp, broke and recycled fiber. Even pulps of non-wood origin, such as agropulp (straw, stalks etc.), may be used.

Figure 2:
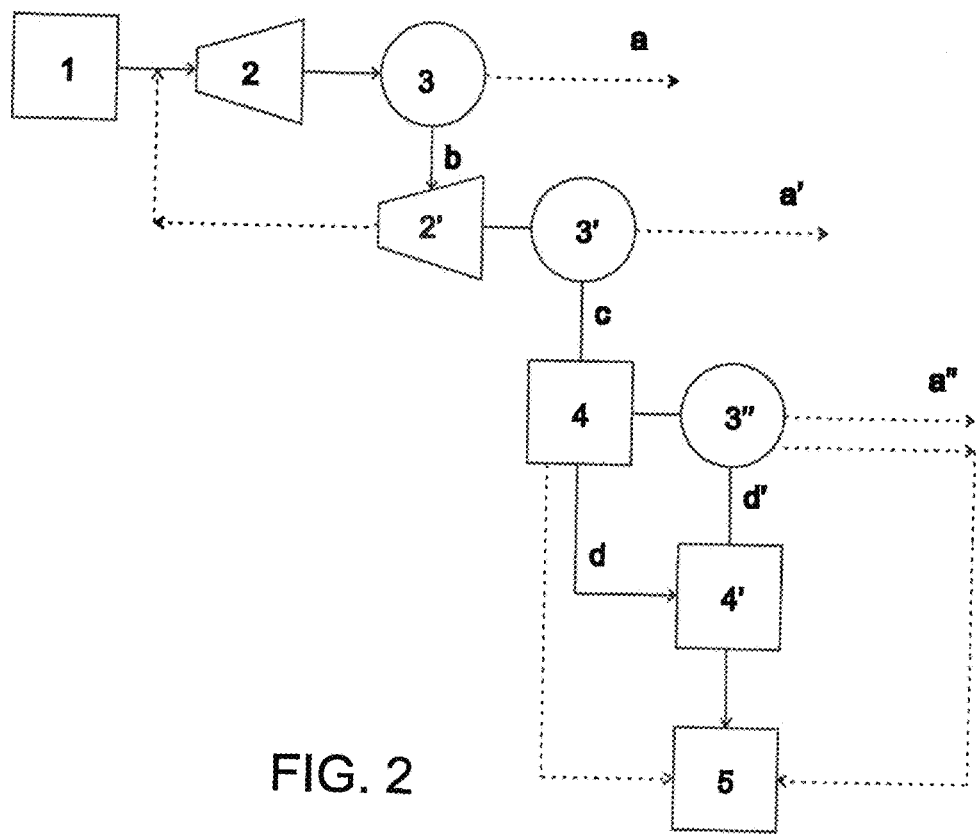

Possible non-limiting embodiments of the invention are illustrated as FIGS. 1 and 2.

In FIG. 1 illustrating one very simple embodiment of the invention there is described a pulp container 1 containing raw material; a low consistency refiner 2; a dewatering unit 3; and a high consistency refiner 4.

In FIG. 2 there is described a pulp container 1 containing raw material; a first low consistency refiner 2; an optional second low consistency refiner 2'; an optional dewatering unit 3 between the first and second low consistency refiner; a dewatering unit 3' before the high consistency refiner 4 and an optional dewatering unit 3" before an optional second high consistency refiner 4'; accept fraction a having a mass consistency of about 1 to 2 wt-% can be removed from the process or circulated back to the process; excess of water a' and a" can be removed from the process; reject fraction b having a mass consistency of about 8 wt-%; fraction c entering to a high consistency refiner having a mass consistency of about 15 wt-%; fraction d and/or d' and/or d" having consistency of about 20 wt-%. Some alternatives are shown by dashed lines.

Within this invention it is possible also to have more than one low consistency refinings in series. Dewatering between refining steps is preferred. Optionally the fibrillated and dewatered fibre fraction can be circulated back to the refining step one more times. There can also be more than one dewatering steps in series. Also a high consistency refining can be repeated using the same or different refining machinery. Adjustment of consistency, usually dewatering or concentration, may be beneficial between the refining steps. The pulp obtained using the process can be further dewatered e.g. for transportation and then before use diluted to suitable consistency.

This invention covers also products obtainable by the method described here and use of such product.

Use of MFC produced as described here comprises a use as a part of a furnish supplied to a papermaking fabric at a paper or board machine. When compared to conventional MFC the MFC obtained according to this invention improves retention of the pulp on the forming fabric of a paper or board machine. This is because of a high aspect ratio of fibrils and a low amount of very fine fines. Initial wet strength of the wet web is very good due to higher solids content formation and to longer fibrils. Also strength properties of the paper or board obtained are improved.

According to a preferred embodiment MFC obtained as described here forms at least 40 wt-% preferably at least 75 wt-% of the dry fibre matter of the furnish because of improved dewatering (compared to normal MFC), it is possible to make close to 100% MFC containing web with this material.

Because of high aspect ratio (long and thin) fibrils, this type of MFC can be considered as an ideal material for different type of composites and similar products where strengthening effect is needed One clear advantage with this MFC is that the amount of very fine fines is very small. Thus drying of this type of MFC is much more simpler (as very fine fines cause in drying formation of hornified small stone like particles).

Use of MFC produced as described here comprises also use as an additive in an injection molded plastic composite. MFC may reduce the weight of the composites and improve strength properties such as crack resistance.

The invention is illustrated by the following non-limiting example. It should be understood that the embodiments given in the description above and the examples are for illustrative purposes only, and that various changes and modifications are possible within the scope of the invention.

EXAMPLE

Never dried pine kraft pulp having consistency of about 4 wt-% was fibrillated using conical refiner to drainage resistance SR of 90 (about 0 as CSF). The resulting pulp was subjected to dewatering until consistency of about 35 wt-%. The pulp was then diluted to consistency of 25 wt-% and then refined 2 to 3 times with high consistency disk refiner.

Figure 3:
FIGS. 3a and 3b show microscopic photos of the fibres obtained using the method of invention. Bar in Figure (a) is 100 μm and in Figure (b) 200 μm.
Figure 3:

The resulting suspension was visually evaluated using a light microscope. It was noted that resulting suspension is essentially homogenous and fibrils have high aspect ratio. Result is shown as FIGS. 3a and 3b.

Obtained high aspect ratio MFC was used in pilot paper machine and compared to typical MFC. The stock consisted of 70% bleached birch and 30 bleached pine refined to 23-26 SR. Amount of MFC used was 25 kg/t. It was surprisingly found that dewatering of high aspect ratio MFC was easier compared to normal MFC. In addition samples containing high aspect ratio MFC had, when compared to normal MFC, improved tear strength, better fracture toughness, higher porosity when compared to normal MFC.

The invention claimed is:

1. A method of producing microfibrillated cellulose (MFC) comprising the steps of:
   (a) mechanically fibrillating fibrous pulp suspension at a first consistency of less than 12.5%,
   (b) directly dewatering fibrillated pulp of said first consistency obtained from step (a) to a second consistency of at least 12.5%,
   (c) Subjecting the dewatered pulp from step (b) to further fibrillation at a consistency of 12.5 to 20% to produce the microfibrillated cellulose.

2. The method of claim 1, wherein said first fibrillation step (a) is low consistency (LC) fibrillation at a consistency of at most 10%, and said further fibrillation step (c) is high consistency (HC) fibrillation at a consistency of 15 to 20%.

3. The method of claim 1, wherein said first fibrillation step (a) is refining and said further fibrillation step (c) is refining or extrusion.

4. The method of claim 1, wherein the pulp is fibrillated to a drainage resistance SR of at least 45°.

5. The method of claim 1, wherein dewatering is performed by pressure screening.

6. The method of claim 5, wherein a fraction retained by the screen is subjected to further fibrillation.

7. The method of claim 1, wherein dewatering is performed by centrifuging.

8. The method of claim 1, wherein a chemical such as a refining aid or an enzyme is used to enhance defibrillation.

9. The method of claim 1, wherein the fibrous pulp suspension comprises chemical pulp, chemithermomechanical pulp (CTMP), thermomechanical pulp (TMP) or groundwood pulp.

10. The method of claim 1, wherein the pulp is fibrillated to a drainage resistance SR of at least 60°.

11. A method of producing microfibrillated cellulose (MFC) comprising the steps of:
   (a) fibrillating fibrous pulp suspension,
   (b) directly dewatering the fibrillated pulp obtained from step (a),
   (c) then repeating said fibrillating and dewatering steps (a) and (b) one or more times, with pulp consistency increased for each fibrillation step (a), and
   (d) subjecting the dewatered pulp from the final dewatering step (b) to a final fibrillation step to produce the microfibrillated cellulose.

12. The method of claim 11, wherein dewatered pulp subjected to the final fibrillation step has a consistency of at least 12.5%.

13. The method of claim 11, wherein the pulp subjected to the final fibrillation step has a drainage resistance SR of at least 45°.

14. The method of claim 11, wherein the first fibrillation step is performed to pulp having a consistency of at most 10%.

15. The method of claim 11, wherein said first fibrillation step (a) is low consistency (LC) fibrillation at a consistency below 10%, and said final fibrillation step (d) is high consistency (HC) fibrillation at a consistency of more than 12.5%.

16. The method of claim 15, wherein a conical or disc refiner is used for the first fibrillation step (a), and a refiner or an extruder is used for the final fibrillation step (d).

17. The method of claim 11, wherein dewatered pulp subjected to the final fibrillation step has a consistency of 15 to 20%.

18. The method of claim 11, wherein the pulp subjected to the final fibrillation step has a drainage resistance SR of at least 60°.

19. The method of claim 11, wherein said first fibrillation step (a) is low consistency (LC) fibrillation at a consistency below 10%, and said final fibrillation step (d) is high consistency (HC) fibrillation at a consistency of 15 to 20%.

* * * * *